Jan. 11, 1927.
B. C. VON PLATEN ET AL
1,613,627
REFRIGERATOR
Original Filed Nov. 21, 1925    2 Sheets-Sheet 1
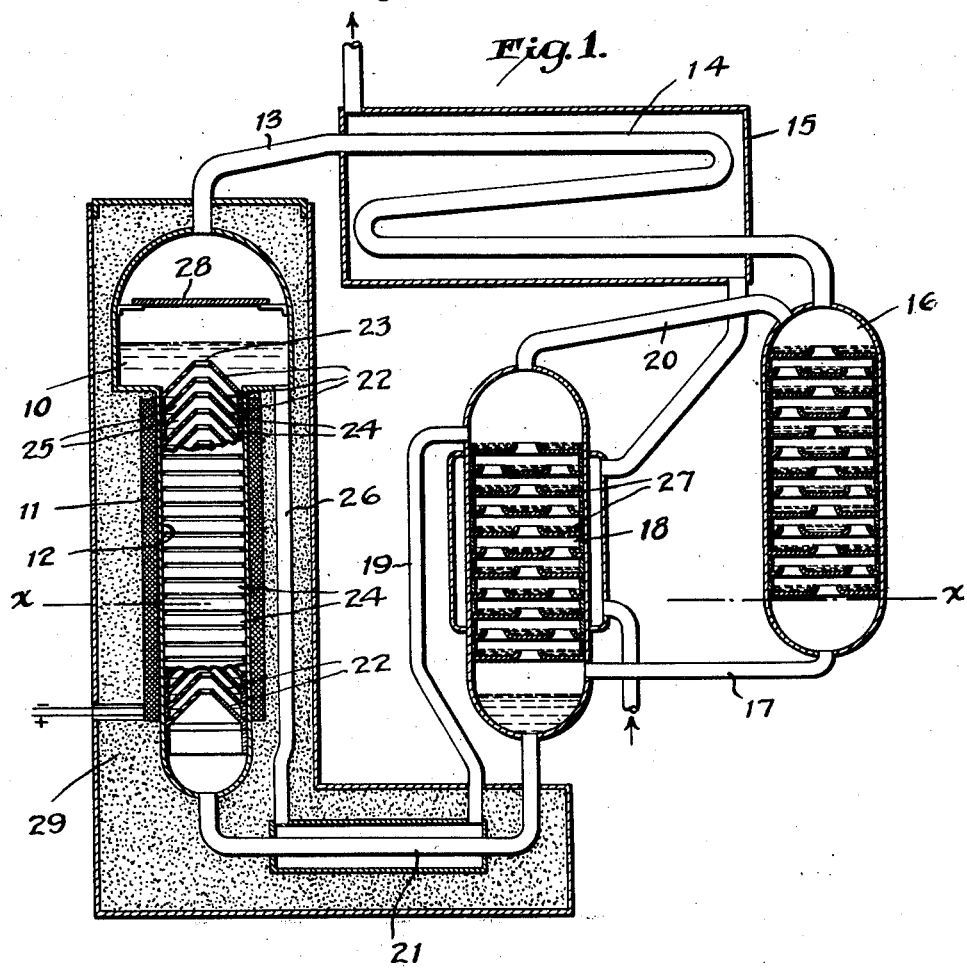
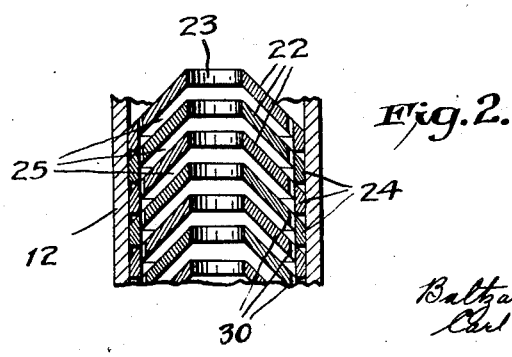

Jan. 11, 1927.  B. C. VON PLATEN ET AL  1,613,627
REFRIGERATOR
Original Filed Nov. 21, 1925   2 Sheets-Sheet 2
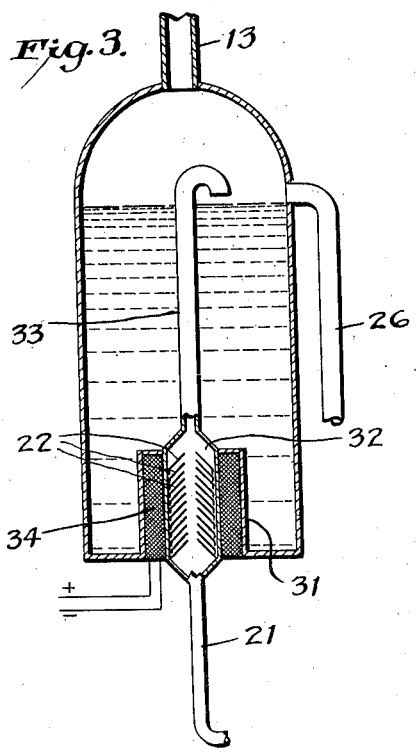
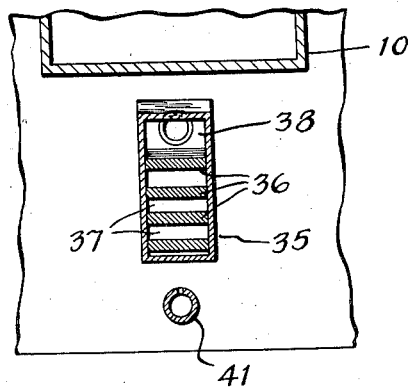
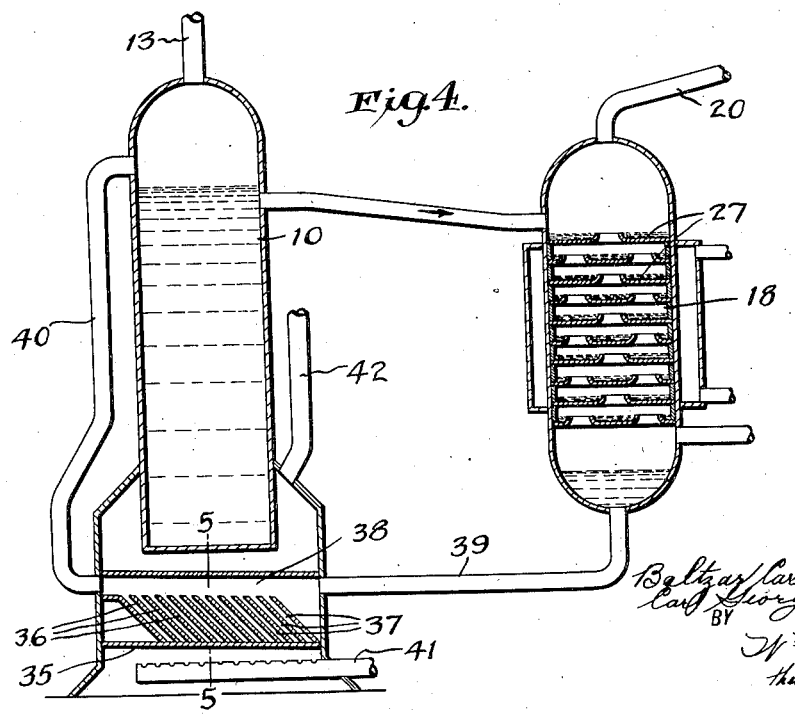

Patented Jan. 11, 1927.

1,613,627

UNITED STATES PATENT OFFICE.

BALTZAR CARL VON PLATEN AND CARL GEORG MUNTERS, OF STOCKHOLM, SWEDEN, ASSIGNORS, BY MESNE ASSIGNMENTS, TO ELECTROLUX SERVEL CORPORATION, A CORPORATION OF DELAWARE.

REFRIGERATOR.

Application filed November 21, 1925, Serial No. 70,648, and in Sweden May 3, 1924. Renewed November 5, 1926.

The present invention relates to refrigerators of the absorption type, and more particularly to refrigerators having a constant total or gauge pressure throughout, in which refrigeration is obtained by evaporation due to diffusion of a cooling agent into another substance.

The invention has for its object to provide an improved circulation between the absorber and the generator in refrigerators of the type above referred to and consists in arranging a series of members to form pockets to which heat is applied, the whole arrangement being of such nature that varopization in the pockets causes flow of liquid.

The invention will be more readily understood by reference to the accompanying drawings in which: Fig. 1 shows one embodiment of the invention in which a series of cone shaped members are placed in the generator proper; Figure 2 shows the cone shaped members of Fig. 1 on enlarged scale; Figure 3 shows an embodiment in which the pocket forming members are placed in an expanded portion of a conduit extending from the absorber to the generator; Figure 4 shows an embodiment wherein the circulating element including the pocket forming members is arranged horizontally; and Figure 5 is a cross-section on line 5—5, Fig. 4.

Referring more particularly to Fig. 1, reference character 10 designates the generator which contains obsorption liquid and in which the cooling agent is abstracted from solution by heat, this being effected in the embodiment shown by means of an electric heating element 11 which surrounds the shell 12 of the generator. Vapor generated in generator 10 passes through conduit 13 into condenser 14 which comprises a conduit in which the vapor is condensed by means of a cooling fluid circulating through cooling jacket 15 surrounding the conduit. From the condenser 14 the cooling agent in the form of liquid passes into the evaporator 16 where it mixes with an auxiliary agent into which it diffuses and evaporates, thus producing refrigeration. For the sake of illustration, assume that the cooling agent is ammonia and the auxiliary agent is hydrogen. Ammonia gas and hydrogen then pass downwardly through the evaporator as a mixture and through conduit 17 into the lower part of absorber 18. In the absorber the ammonia gas is separated from the hydrogen and passes into solution in absorption liquid supplied to the absorber by way of conduit 19. The hydrogen thus freed passes upwardly in the absorber and through conduit 20 back into the evaporator to again mix with ammonia coming from the condenser. The present invention is not specifically directed to the general arrangement thus far described, and this arrangement is herein set out for the purpose of illustration. For a further and more detailed description of the operation of the parts hereinbefore described, reference may be had to Patent No. 1,609,334 of December 7, 1926. The arrangement thus far described and as set out in that patent is not the only arrangement applicable to use with the present invention as will be understood upon further description.

Strong absorption liquid passes through conduit 21 from the lower part of the absorber to the lower part of the generator 10.

Within the generator are situated a series of cones 22, preferably of thin pressed steel. The cones have openings at their apices forming a central passage-way 23 for flow of absorption liquid through the generator. The cones are made and arranged so as to leave a pocket 25 between each of any two adjacent cones, this being accomplished in the embodiment illustrated by means of flanges 24, more clearly shown in Fig. 2. Pockets 25 extend obliquely upwardly and form paths for vapor produced therein which vapor being injected into the central passage-way 23 acts in the manner of an injector to cause an upward movement of the liquid in the central passage-way. The formation of vapor in pockets 25 is effected by having heating element 11 surrounding the shell of the generator at the portions of the generator where passage ways 25 come adjacent the shell. Not alone is there a great transfer of heat through the shell, but also the cones act as heat transmitting members and conduct heat through their oblique length to the fluid within the pockets, 25. In order that the heat transmission shall be as effective as possible, the cones are so made and inserted into the generator that the flanges 24 have tight fit with the shell 12.

The operation and effect of the generator arrangement thus far described is as follows:

Assume first that the refrigerator is out of operation, that is, without heat supply. In this condition, the various parts of the system being in open communication, the liquid is at a common level in the generator and absorber and possibly also in the evaporator. This level may for example be the line x—x. In this condition some of the pockets 25 contain liquid. Now assume that heat is applied by passing current through the heating element 11. Vapor bubbles are then formed in the lower part of each of those pockets which contain liquid, the first formation of vapor occurring directly adjacent the shell due to the greater rate of heat conductivity to these places and thus there is formed in each pocket containing liquid a body of obliquely extending liquid with one or more bubbles of vapor formed behind the body and expanding against the body, due to evaporation. The result is that the liquid is forced upwardly into the central passageway, shooting upwardly and in part flowing and falling into higher pockets where this process of vapor formation behind a body of liquid again takes place, and thus there is a multitude of upwardly directed forces having a common effect of forcing liquid upwardly in the generator so that when the refrigerator finally comes into active operation, there is practically continuous flow through the central passageway 23 to the upper part of the generator, caused by this intermittent flow of liquid into pockets 25, formation of vapor and driving out of liquid. The vapor formed separates from the liquid in the upper part of the generator and passes to the condenser as before described.

The upper part of the generator is, in this case, made larger in order to have a larger disengaging surface and to form a reservoir space for absorption liquid from which weak absorption liquid flows downwardly through conduit 26 and through conduit 19 into the upper part of the absorber in which it flows downwardly over baffling plates 27 and absorbs cooling agent.

Conduits 19 and 26 on the one hand and conduit 21 on the other hand may be arranged to exchange heat, if desired, as shown in Figure 1.

In the vapor space of the generator 10 there is preferably a plate 28 or other baffling means to prevent liquid from passing into conduit 13. This plate acts to dry the vapor formed in the generator.

The generator and heat exchanger between the absorber and the generator are preferably surrounded by heat insulating material 29.

It has been found advantageous in some forms of apparatus to place small holes 30 near the lower edges of the cones. This permits liquid to enter pockets 25 more readily and causes a more rapid starting of the apparatus.

In the embodiment shown in Fig. 3, the cones, instead of being arranged in the generator proper, are arranged in the conduit 21 leading from the absorber to the generator. In this embodiment a heating chamber 31 projects into the lower part of the generator and within this heating chamber is a cone chamber 32 containing cones of similar kind to those above described. Conduit 21 connects with cone chamber 32 at the bottom and a conduit 33 leads upwardly from the upper part of cone chamber 31 to the vapor space of the generator, where it is formed into a goose-neck bend to throw the absorption liquid downwardly into the liquid space of the generator while the vapor generated in cone chamber 32 and conduit 33 passes around the end of the conduit and upwardly to conduit 13 which leads to a condenser as in Fig. 1. Between cone chamber 32 and the inner wall of chamber 31 is placed an electrical heating element 34.

In the embodiment shown in Figs. 4 and 5, the circulating element containing the pockets is placed in a general horizontal direction and propulsion of liquid is caused to take effect in a horizontal direction. In this case the circulating member is a casting of general rectangular cross-sectional form, as indicated in Fig. 5. Within this casting is a series of obliquely placed plates 36 forming pockets 37 between them. These plates are so arranged within the casting 35 as to leave a longitudinally extending channel 38 extending along the whole length of the casting. Absorption liquid passes into channel 38 and into pockets 37 from conduit 39 and passes out of channel 38 through conduit 40 into the upper part of the generator 10. The casting 35 is heated by a gas burner 41 which also serves to heat the generator 10. 42 designates an outlet for the products of combustion.

The operation of this modification is substantially the same as that previously described. Absorption liquid flows into pockets 37 where it is vaporized resulting in an injection of liquid and vapor into channel 38 in an oblique direction to the desired direction of flow, thereby giving a movement to the liquid in channel 38 and causing a flow of liquid from the lower part of the absorber to the upper part of the generator.

What we claim is:

1. A refrigerator comprising a generator, a condenser, an evaporator, an absorber, a circulating system for absorption liquid between and through said generator and absorber, said system comprising a series of pockets extending obliquely to the main line of flow and opening thereinto in the general direction of flow and means to heat said pockets.

2. A refrigerator comprising a generator, a condenser, an evaporator, an absorber, means to conduct liquid from the generator to the absorber, means to conduct liquid from the absorber to the generator, and a series of elements in said generator forming a central passageway, and a series of pockets surrounding said passage way and extending upwardly and obliquely with respect to and opening into said central passage way and means to heat the lower ends of said pockets.

3. A refrigerator comprising a generator, a condenser, an evaporator, an absorber, means to conduct liquid from the absorber to the generator, means to conduct liquid from the generator to the absorber, a series of members in said generator forming a central passage way, and pockets surrounding said central passage way, a baffling member in the upper part of said generator and means to heat said generator at the lower ends of said pockets.

4. A refrigerator comprising a generator, a condenser, an evaporator, an absorber, a circulating system for absorption liquid between and through said generator and absorber, said system including a main passageway for flow of liquid, a series of pockets opening into said passageway and means to heat said pockets.

5. A refrigerator comprising a generator, a condenser, an evaporator, an absorber, a circulating system for absorption liquid between and through said generator and absorber, said system including a main passageway for flow of liquid and a series of pockets adjacent to said passageway and extending upwardly and communicating with said passageway and means to heat the lower ends of said pockets.

In testimony whereof we hereunto affix our signatures.

BALTZAR CARL von PLATEN.
CARL GEORG MUNTERS.